United States Patent Office 3,221,574
Patented Dec. 7, 1965

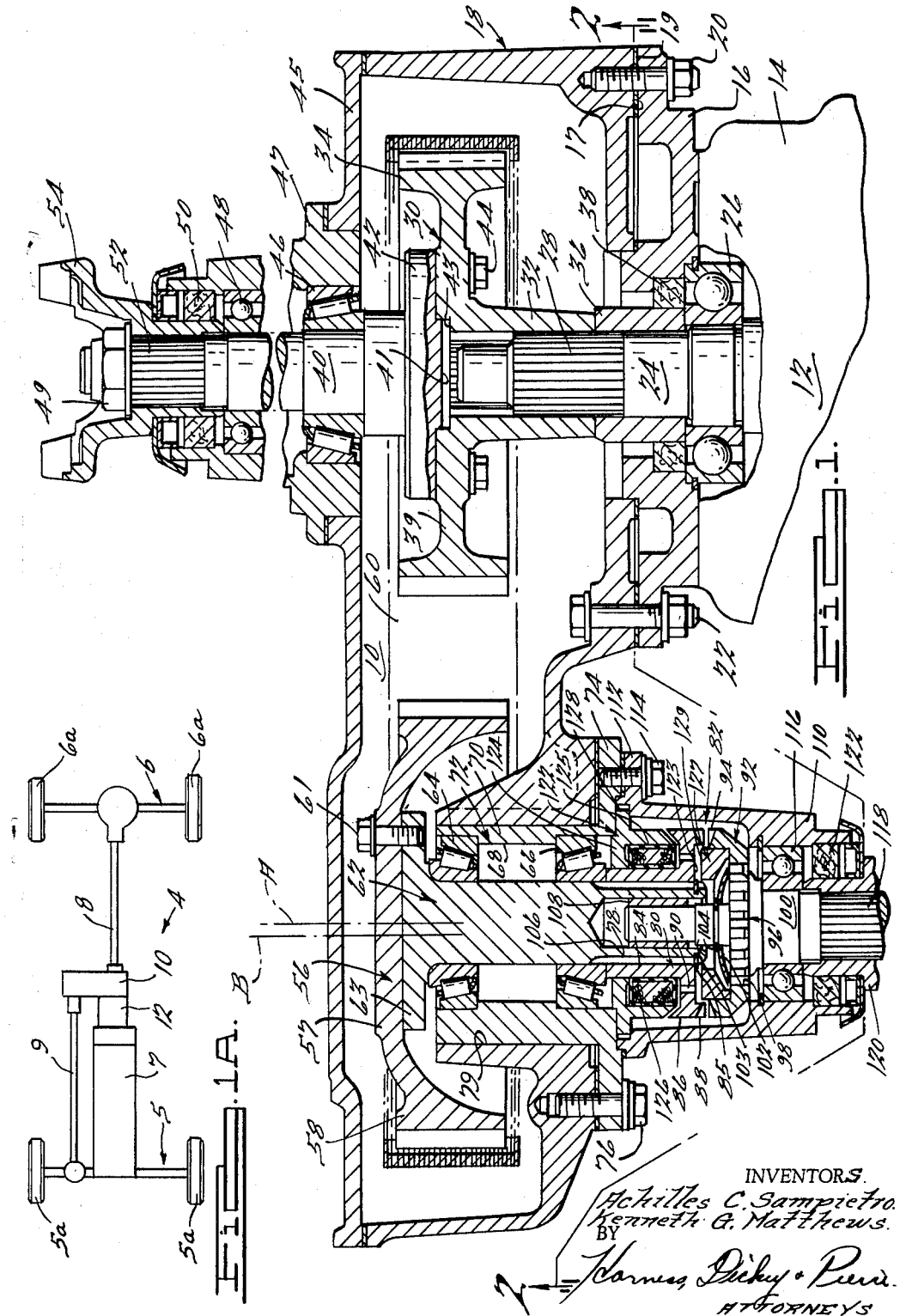

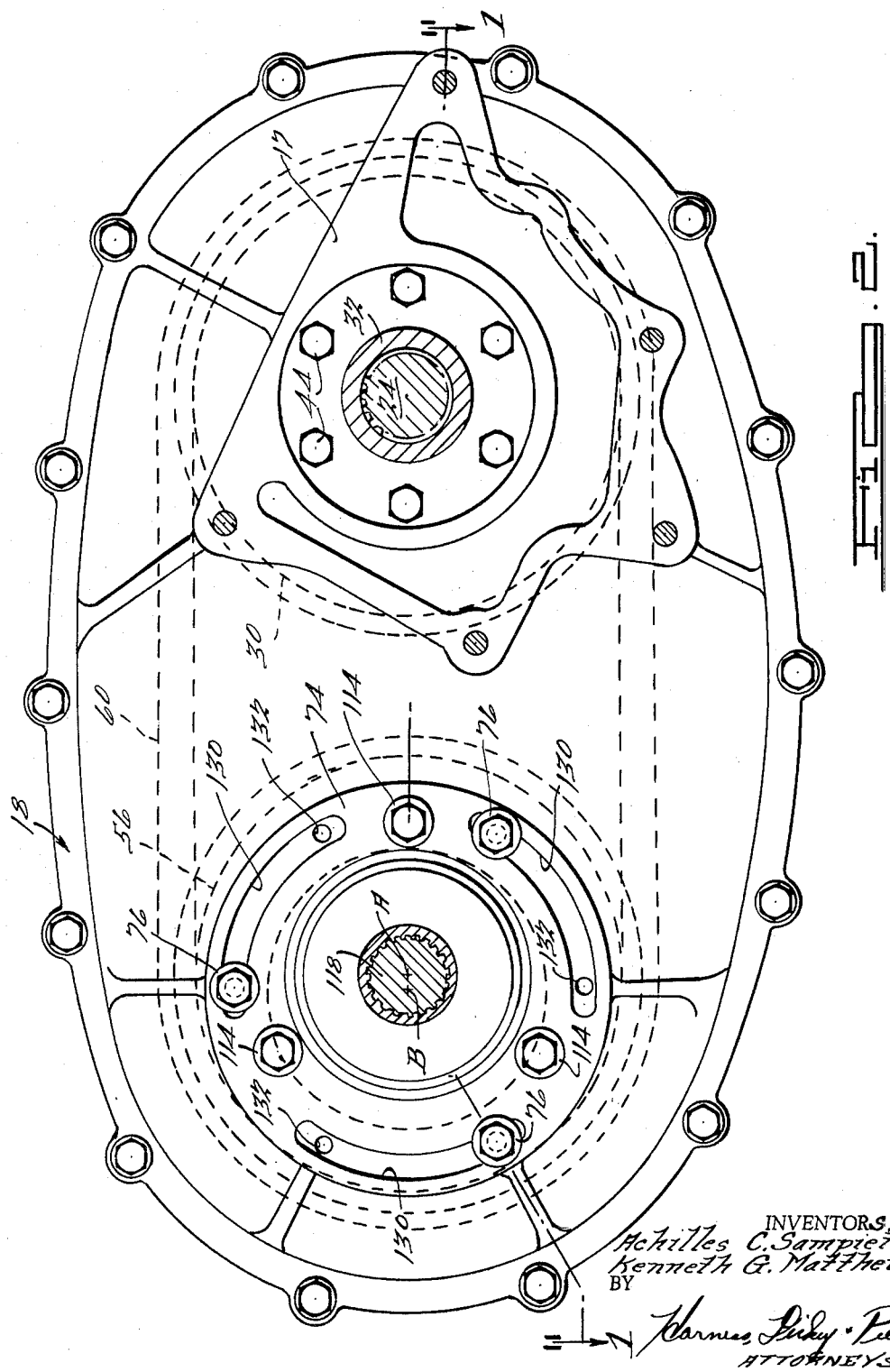

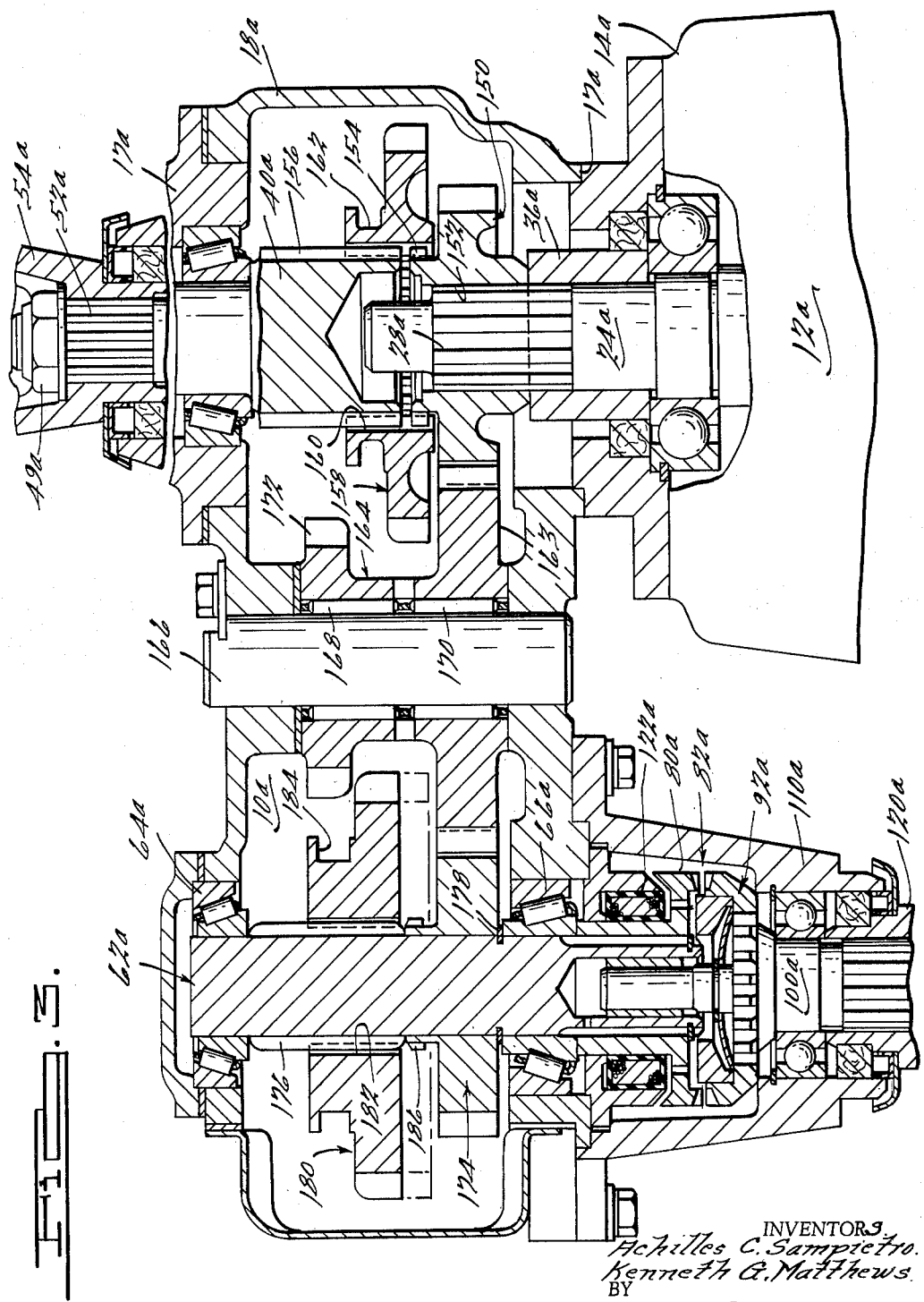

3,221,574
TRANSFER CASE
Achilles C. Sampietro, Bloomfield Hills, and Kenneth G. Matthews, Grosse Pointe Woods, Mich., assignors to Kaiser Jeep Corporation, a corporation of Nevada
Filed Nov. 13, 1962, Ser. No. 237,009
11 Claims. (Cl. 74—665)

This invention relates to transfer cases for automotive vehicles.

In general, a transfer case is utilized in a four wheel drive automotive vehicle for transmitting power to the rear wheels and is selectively engageable for transmitting power to the front wheels. One problem in the past with conventional transfer case designs has been an excessive amount of gear noise; therefore, it is an object of this invention to provide a transfer case for an automotive vehicle which is quiet in operation.

Another problem with transfer cases of conventional design is the difficulty in shifting into and out of four wheel drive; it is a further object of this invention to provide a transfer case of a novel construction in which shifting into and out of four wheel drive can be done easily and relatively effortlessly.

Other objects, features, and advantages of the present invention will become apparent from the subsequent description and the appended claims, taken in conjunction with the accompanying drawings, in which:

FIGURE 1A is a plan view of a portion of a vehicle chassis exemplifying a preferred arrangement of components including the transfer case of the present invention;

FIGURE 1 is a plan view with some parts shown broken away, some parts partially shown and other parts shown in section of a transfer case embodying the features of this invention and being a sectional view substantially taken along the lines 1—1 of FIGURE 2;

FIGURE 2 is a front elevational view of the transfer case of FIGURE 1 taken substantially along the line 2—2 in FIGURE 1; and FIGURE 3 is a plan view with some parts shown broken away, some parts partially shown and other parts shown in section of a modified transfer case embodying some of the features of this invention.

Considering first FIGURE 1A, a portion of a vehicle chassis 4 is depicted and includes a front axle assembly 5 having a pair of front wheels 5a and a rear axle assembly 6 having a pair of rear wheels 6a. The rear wheels 6a are driven by an engine 7 via a power train through a transmission assembly 12, a transfer case 10 and a drive shaft 8. The front wheels 5a are driven via a power train through transmission assembly 12, transfer case 10, and a drive shaft 9.

Looking now to FIGURE 1, a transfer case embodying the features of this invention is generally indicated by the numeral 10 and is adapted to be mounted to a transmission assembly 12 (only partially shown) having the chassis portion 4 of an automotive vehicle (not shown). The transmission 12 can be of a conventional design and has a housing assembly 14 extending toward the rear of the vehicle and terminating at its rearward end in a flange 16 to which is attached the transfer case 10 at a forwardly facing portion 17 of a housing 18 via a plurality of stud and bolt assemblies 20 and 22, respectively. A seal 19 is located between the forward face portion 17 and the mating rear surface of the flange 16. The transmission assembly 12 has a rearwardly extending drive shaft 24 radially supported near its outer or rearward end by a bearing 26 which is secured in a conventional manner within a recess in the transmission housing 14. The drive shaft 24 extends axially into the confines of the transfer case housing 18 and has a splined portion 28 located therein.

A drive sprocket 30 has a tubular extension portion 32 which is internally splined to fit matably over the splined portion 28 of the drive shaft 24 and has an annular sprocket portion 34. The drive sprocket 30 is spaced axially along the drive shaft 24 by means of a spacer ring 36 which extends over the innermost portion of the drive shaft 24 and engages the inner race of bearing 26. An annular seal 38 is located within a recess in transmission housing 14 and radially engages the spacer ring 36 at its axially inner end and is proximate the inner and outer races of the bearing 26 to thereby provide a seal.

A rear wheel drive shaft 40 extends axially rearwardly and terminates at its forward end in an annular flange portion 42 which is attached, by means of a plurality of bolts 44, to the radially extending inner web portion 39 of the sprocket portion 34 of the drive sprocket 30. The rear wheel drive shaft 40 has a reduced diameter portion 41 piloted within a counterbore 43 in the rearward face of the web portion 39 and hence is substantially in axial ailgnment with the transmission drive shaft 24. The rear wheel drive shaft 40 extends rearwardly and outwardly beyond the rearward side 45 of the transfer case housing 18 and through a rearwardly extending, tubular housing extension 47 which is secured to the rearward side 45 of the transfer case housing 18. The rear drive shaft 40 is supported within the housing extension 47 by a thrust and radial load bearing 46 and by a ball bearing 48. The rear wheel drive shaft 40 terminates in a splined portion 52 to which is secured a yoke 54 of a universal joint assembly (only partially shown), via a nut and washer assembly 49, with the universal joint assembly in turn being connected to a drive shaft (not shown) for driving the rear wheels of the vehicle. A seal 50 is provided proximate the rearward end of the extension 47 radially between a sleeve portion of the yoke 54 and the extension 47. Thus the rear wheels of the vehicle are directly powered by the transmission assembly 12 via the transmission drive shaft 24, the drive sprocket 30 and the rear wheel drive shaft 50.

Transversely and eccentrically spaced within the transfer case housing 18 relative to the axis of the drive sprocket 30 is the axis A of a driven sprocket 56. An annular sprocket portion 58 of driven sprocket 56 is interconnected with the sprocket portion 34 of the drive sprocket 30 by means of a continuous chain 60. The sprocket portions 34 and 58 are of the same diameter such that rotation of the drive sprocket 30 causes a corresponding rotation of a driven sprocket 56 at the same angular velocity. The sprocket portions 34 and 58 can be of a conventional design with each having annularly disposed teeth engageable with the links of the chain 60.

An axially forwardly extending spindle 62 is secured at a rearwardly disposed flange portion 63 to an inner web portion 57 of the driven sprocket 56 by means of a plurality of bolts 61. The spindle 62 is coaxially disposed within a bore 68 of a tubular portion 70 of a sleeve 72 and is radially supported therein by a pair of axially spaced bearings 64 and 66 located within the bore 68 of tubular portion 70. The outer surface of the sleeve 70, while generally circular in cross section, has an axis B eccentric relative to the axis A of the spindle 62 and hence of the bore 68. The tubular portion 70 of the sleeve 72 is rotatably secured within an elongated bore 79 defined in the forward face of the transfer case housing 18 and terminates at its forward end in a radially outwardly extending flange portion 74 which is engagebable with the forward side of the transfer case housing 18. A plurality of bolts 76 secure the sleeve 72 to the forward side of the transfer case housing 18 at the flange portion 74. The spindle 62 terminates at its forward end in a splined portion 78 which has matably disposed thereon a drive member 80 of a magnetically actuable dog clutch assembly 82. The drive member 80 is comprised of a tubular portion 84 which is internally splined to matably engage the splined portion 78 of the spindle 62. The tubular portion 84 terminates at its forward end in a radially outwardly extending drive clutch portion 86 which has a plurality of radially disposed, axially extending teeth 88 on its forward face. The rear face of the tubular portion 84 of the drive member 80 engages the inner race of bearing 66 while the forward face engages a snap ring 85 secured to the splined portion 78. Thus the drive member is held from moving axially. The drive clutch portion 86 and sleeve portion 84 are made of magnetic material, i.e., low reluctance, and are separated from each other by a ring 90 of non-magnetic material, i.e., high reluctance, for a purpose to be readily seen. A generally annular driven member 92 of the dog clutch assembly 82 has a plurality of radially disposed, axially extending teeth 94 on its rearward face which are matably engageable with the teeth 88 on the drive member 80. The driven member 92 has a coarsely splined bore 98 and is slidably mounted upon a similarly coarsely splined annular flange 96 located on the rearward end of a front wheel drive shaft 100.

The teeth 94 of driven member 92 are maintained out of engagement with the teeth 88 of the drive member 80 by means of an annular dished spring member 102 which extends radially outwardly engaging the driven member 92. The dished spring member 102 is annularly disposed about an extension portion 103 of the front drive shaft 100 and is restrained from axially rearward movement by means of a spring clip 104. To insure proper alignment and engagement of teeth 94 with teeth 88 the extension portion 103 is piloted within an annular bore 106 located within the splined end portion 78 of the spindle 62 and is rotatably secured therein by means of a bushing 108.

A generally tubular, axially forwardly extending housing extension 110 terminates at its axially rearward end in a flange portion 112. The housing extension 110 has its flange portion 112 secured to the flange portion 74 of the sleeve member 72 via a plurality of bolts 114. The front drive shaft 100 is located substantially coaxially relative to the spindle 62 and is rotatably supported near the forward end of the housing extension 110 by means of a bearing 116 and terminates at its forward end in a splined portion 118 for receiving a yoke 120 (partially shown) of a universal joint (not shown) for attachment to a drive shaft for driving the front wheels of the vehicle. An annular seal 122 is radially disposed between a sleeve portion of the yoke 120 and the outer end of the housing extension 110.

An electromagnet assembly 122 has an annular housing 124 of magnetic material which is located about the sleeve portion 84 of the drive clutch member 80 and has located in an annular recess 125 in its forward end an annularly wound coil 126. The electromagnet assembly 122 is secured from relative axial movement by means of a flange portion 128 of the housing 124 sandwiched between a recess in the rear face of the housing extension 110 and the forward face of the sleeve member 72. Thus, as power is provided from the transmission assembly 12 to drive shaft 24, to the drive sprocket 30, and to the rear wheel drive shaft 40, power is also being transmitted from the drive sprocket 30, to driven sprocket 56, to the spindle 62, and thence to the drive member 80 of the dog clutch assembly 82. However, since the driven member 92 is maintained axially separated from the drive member 80 by means of the spring 102, no power is transmitted to the front wheels via the front wheel drive shaft 100. The coil 126 of the electromagnet assembly 122 can be connected to a source of direct current electrical potential, i.e., as the battery of the vehicle, and can be energized by conventional means, i.e., a switch located at the dash and hence accessible to the operator. Upon energization of the coil 126, a magnetic path is set up through the outer clutch portion 86 of the drive clutch member 80, through the gap between the teeth 88 and 94 of the drive member 80 and driven member 92, respectively, and thence back to the sleeve portion 84 of the drive member 80. Thus a magnetic force is created urging the drive member 80 and driven member 92 axially towards each other. Since the drive member 80 is axially fixed via the retainer ring 85, the driven member 92 is caused to move axially rearwardly over the splined flange 96 moving the teeth 94 into engagement with the teeth 88, thereby completing a line of power transmission to the front wheels of the vehicle. The magnetic force created is sufficient to overcome the spring 102.

An annular contact member 127 is secured within a recess in the rearward face of the drive member 92 and has a rearward face 129 extending axially beyond the recess in the driven member 92. The face 129 is engageable with a generally flat surface 123 defined by forwardly facing surfaces of the tubular portion 84, the ring 90, and the clutch portion 86 thereby providing a good magnetic path to hold the drive member 80 and driven member 92 in engagement. The surface 123 defines the axially rearward extremity of a cavity in the rearward face of the drive member 80, which cavity receives the portion of the contact member 127 extending axially beyond the driven member 92.

Upon deenergization of the coil 126 of the electromagnet assembly 122, the spring 102 will cause movement of the driven member 92 axially forwardly moving the teeth 94 out of engagement with the teeth 88, hence interrupting the transfer of power to the front wheels. Since under normal driving conditions the front and rear wheels are moving at substantially the same speed, engagement of the front wheels can be caused to occur with substantially no synchronization problems. Note that, with the design as shown, engagement of the front wheels into front wheel drive is accomplished simply by the actuation of the electromagnet assembly 122, thus alleviating the problem of difficulty in shifting gears. Note also that by using a chain drive the problem of excessive gear noise is eliminated, resulting in a transfer case which is quiet in operation.

It is normal that a chain, such as chain 60, undergo a slight amount of elongation under initial running conditions. This results in the chain 60 being in tension on one side and having slack on the other. If the direction of travel of the vehicle is reversed, the chain 60 is then tensioned on the slack side resulting in high impact loads to the chain 60 and to the teeth of the sprocket 30 and 56. The slack in the chain 60 can be taken up after the initial break-in period by moving the sprockets 30 and 56 transversely relative to each other. This can be done by merely rotating the sleeve 72 within the bore 78 with the eccentricity between the axis A of the spindle 62 and of the axis B of the outer surface of the tubular portion 70 of the sleeve 72, resulting in relative transverse movement between the sprockets 30 and 56. Referring now to FIGURE 2, the flange portion 74 of sleeve 72 is provided with a plurality of arcuately extending slots 130 which receive the plurality of mounting bolts 76; thus, by simply loosening the bolts 76, the sleeve assembly 72 can be rotated about the axis B of the bore 78, hence transversely displacing the sprocket 56 relative to the sprocket 30. A plurality of threaded bores 132 are provided at alternate locations in the forward face of transfer case housing 18 along the slots 130 to receive the bolts 76 in the event that adjustment in that direction is required. Thus means have been provided whereby the slack in the chain 60 can be taken up.

A modified transfer case embodying some of the features of this invention is shown in FIGURE 3. In the embodiment of FIGURE 3, components similar to components in the embodiment of FIGURES 1 and 2 and performing similar functions are identified with like numbers with the addition of a letter subscript. For the sake of simplicity and because of the evident similarity of components, a detailed description will not be given of components similar to those previously described. Looking now to FIGURE 3, a transfer case of the gear drive type is generally indicated by the numeral 10a and is adapted to be mounted to a transmission assembly 12a (only partially shown) of an automotive vehicle (not shown). The transmission 12a is similar to the transmission 12 and has a housing 14a which can be attached to the transfer case 10a at a forwardly facing portion 17a by conventional means. The transmission 12a has a drive shaft 24a which is radially supported in a manner similar to the drive shaft 24 and has a splined portion 28a located within the confines of the transfer case housing 18a.

A drive gear 150 has a central bore 152 which is splined to matably engage the splined portion 28a. The drive gear 150 is axially spaced along the splined portion 28a via a spacer ring 36a. A reduced diameter portion 154 on drive gear 150 extends axially rearwardly and is splined about its outer radial surface. A rear wheel drive shaft 40a is partially disposed within the transfer case housing 18a and extends axially rearwardly therefrom and is rotatably supported in an extension 17a at the front of housing 18a in a manner similar to that of the drive shaft 40 in extension 17. The rear wheel drive shaft 40a has a splined portion 52a proximate its rearward end to which is secured a yoke 54a of a universal joint assembly (only partially shown) via a nut and washer assembly 49a. The universal joint assembly is connected to the rear wheels by conventional means for driving the vehicle. The rear wheel drive shaft 40a terminates at its axially forward end in a portion 156 splined on its radially outer surface. A drive and connecting gear member 158 is slidably secured to the splined portion 156 of shaft 40a via an internally splined bore 160 and is movable axially along the splined portion 156 by a fork (not shown) having a pair of fingers engageable within an annular slot 162. The fork can be manipulated by conventional linkage systems not constituting a part of this invention. The splined bore 160 is matable with the splined portion 154 of the drive gear 150. With the gears 150 and 158 in the position as shown, the transmission drive shaft 24a transmits power to the rear wheels of the vehicle via the splined connection between the drive shaft 24a and the drive gear 150, the splined connection between the splined portion 154 of the drive gear 150 and the bore 160 of the drive and connecting gear 158 and the splined connection between the bore 160 of the drive and connecting gear 158 and the splined portion 156 of the rear wheel drive shaft 40a. Thus the drive gear 150 can be selectively engaged or disengaged with the drive shaft 24a to selectively transmit power to the rear wheels by moving the splined bore 160 into or out of engagement with the splined portion 154.

The drive gear 150 is continuously in engagement with a gear section 163 of an intermediate gear member 164 which is rotatably secured via bearings 168 and 170 about a countershaft 166 fixed to the housing 18a. The intermediate gear member 164 also has a second gear section 172 axially spaced from the gear section 163 which serves a purpose to be presently described. The intermediate gear section 163 is continuously engaged with a front wheel high drive gear 174 which is rotatably disposed about a spindle 62a. The high drive gear 174 is axially restrained on spindle 62a between a shoulder defined by an enlarged diameter splined portion 176 on spindle 62a, and a lock ring 178 disposed in a groove in spindle 62a. A low drive and connecting gear 180, which serves a purpose to be presently described, is slidably mounted to the enlarged diameter splined portion 176 via a splined bore 182. The spindle 62a is rotatably supported in housing 18a via a rear bearing 64a and a forward bearing 66a. The axially forward end of the spindle 62a (from approximately the forward bearing 66a on) is identical in construction to the axially forward end (from approximately the forward bearing 66 on) of the spindle 62 and extends into a housing extension 110a similar to extension 110. The spindle 62a has secured at its forward end a drive member 80a of a magnetically actuable dog clutch assembly 82a which has a driven member 92a secured to a front wheel drive shaft 110a. The magnetically actuable dog clutch assembly 82a can be actuated by means of an electromagnetic asembly 122a and operates in a manner similar to that of the dog clutch assembly 82, previously described. The front wheel drive shaft 100a is rotatably supported at the outer end of the housing extension 110a and has a yoke 120a (partially shown) of a universal joint (not shown) for attachment to a drive shaft for driving the front wheels of the vehicle. As previously noted, the vehicle can be placed in or out of four-wheel drive by energizing or deenergizing the coil of the electromagnet assembly 122a, thereby engaging or disengaging the dog clutch assembly 82a whereby the spindle 62a is connected or disconnected to the front wheel drive shaft 100a.

With the specific orientation of components as shown in FIGURE 3, the magnetically actuable dog clutch assembly 82a is shown disengaged whereby the vehicle is maintained in rear or two-wheel drive. At the same time, note that with the high drive gear 174 rotatable about the spindle 62a no power is coupled to the spindle 62a from the transmission 12a. The low drive and connecting gear 180 can be axially moved along the splined portion 176 by means of a pair of fingers of a fork (not shown) disposed in an annular groove 184 in gear 180; the fork can be manipulated by a suitable linkage (not shown). The high drive gear 174 is provided with a reduced diameter portion 186 which is externally splined and which is engageable with the splined bore 182 as the low drive and connecting gear 180 is moved axially forwardly along the splined portion 176. With the splined bore 182 in engagement with the splined portion 186 the spindle 62a is coupled to the transmission drive shaft 24a via the gear section 163 of the intermediate gear member 164 and the drive gear 150. By actuating the electromagnet assembly 122a, the drive member 80a and drive member 92a of the dog clutch assembly 82a can be pulled into engagement thereby transferring power to the front wheels via the front wheel drive shaft 100a. This places both the front and rear wheels of the vehicle in the high gear range.

In order to place the rear wheels of the vehicle in low drive, the drive and connecting gear 158 can be moved axially rearwardly along the splined portion 156 of the rear wheel drive shaft 40a into engagement with the second gear section 172 of the intermediate gear member 164. At the same time, of course, the low drive and connecting gear 180 is out of engagement with the portion 186 of high drive gear 174, thereby interrupting power transfer to the front wheels. Power is then transmitted to the rear wheels from drive shaft 24a via the engagement of drive gear 150 with gear section 163, the engagement of the other gear section 172 with drive and connecting gear 158 and via the connection between gear 158 and rear wheel drive shaft 40a. To engage the front wheels, the low drive and connecting gear 180 is moved axially rearwardly along the splined portion 176 of the spindle 62a and into engagement with the second gear section 172 of intermediate gear 164. At this time the drive line to the front wheels from the transmission drive shaft 24a is via the engagement of the drive gear 150 with gear section 163, the engagement of gear section 172 with the low drive and connecting gear 180, the connection between gear 180 and spindle 62a, and through the dog clutch assembly 82a to the front wheel drive shaft 100a.

In the gear type transfer case 10a an interlock system (not shown) can be provided to insure proper shifting of gears such that with the rear wheels in low the front wheels can be shifted from neutral only into low and likewise with the rear wheels in high the front wheels can be shifted from neutral only into high.

Thus it can be seen that the gear type transfer case 10a can be connected into or out of four-wheel drive effortlessly via the electromagnet assembly 122a and the dog clutch assembly 82a.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an automotive vehicle having a set of front and a set of rear wheels driveable from a source of power, the combination comprising: a transfer case for coupling the set of front and the set of rear wheels to the source of power, said transfer case including first means coupling the set of rear wheels to the source of power, said first means including a first sprocket member, a continuous chain member engageable with said first sprocket member, second means operatively connected to said first means for coupling the set of front wheels to the source of power through said first means, said second means including a second sprocket member engageable with said chain member whereby said second means is coupled to said first means, said second means including clutch means selectively operable for selectively connecting said second means to the set of front wheels.

2. In an automotive vehicle having a set of front and a set of rear wheels driveable from a source of power, the combination comprising: a transfer case for coupling the set of front and the set of rear wheels to the source of power, said transfer case including first means coupling one set of the set of front and set of rear wheels to the source of power, said first means including a first sprocket member, a continuous chain member engageable with said first sprocket member, second means operatively associated with said first means for coupling the other set of the set of front and set of rear wheels to the source of power through said first means, said second means including a second sprocket member engageable with said chain member whereby said second means is coupled to said first means, clutch means selectively operable for connecting one of said first and said second means to that one of the sets of the set of front and the set of rear wheels with which it is individual.

3. In an automotive vehicle having a set of front and a set of rear wheels driveable from a source of power, the combination comprising: a transfer case for coupling the set of front and the set of rear wheels to the source of power, said transfer case including first means coupling one set of the set of front and the set of rear wheels to the source of power, said first means including a first sprocket member, a continuous chain member engageable with said first sprocket member, second means operatively associated with said first means for coupling the other set of the set of front and set of rear wheels to the source of power through said first means, said second means including a second sprocket member engageable with said chain member whereby said second means is coupled to said first means, and adjustment means operatively associated with one of the set of sprocket members composed of said first sprocket member and said second sprocket member and selectively movable for varying the distance between said first sprocket member and said second sprocket member whereby the tension on said chain member can be adjusted, clutch means selectively operable for connecting one of said first and said second means to that one of the sets of the set of front and set of rear wheels with which it is individual.

4. In an automotive vehicle having a set of front and a set of rear wheels driveable from a source of power, the combination comprising: a transfer case for coupling the sets of front and rear wheels to the source of power, said transfer case including a housing, first means disposed in said housing for coupling one set of the set of front and set of rear wheels to the source of power, said first means including a first sprocket member, a continuous chain member disposed in said housing and engageable with said first sprocket member, second means disposed in said housing and operatively associated with said first means for coupling the other set of the set of front and set of rear wheels to the source of power through said first means, said second means including a second sprocket member engageable with said chain member whereby said second means is coupled to said first means, a sleeve member rotatably disposed in a bore in said housing for rotation about a first axis, said sleeve member having a bore having a second axis eccentric to said first axis, means rotatably securing one of the set of sprocket members composed of said first sprocket member and said second sprocket member within said bore in said sleeve member for rotation about said second axis whereby said sleeve member can be selectively rotated about said first axis for varying the distance between said first sprocket member and said second sprocket member for adjusting the tension of said chain member, clutch means selectively operable for connecting one of said first and said second means to that one of the sets of the set of front and rear of rear wheels with which it is individual.

5. In an automotive vehicle having a set of front and a set of rear wheels drivable from a source of power, the combination comprising: a transfer case for coupling the set of front and the set of rear wheels to the source of power, said transfer case including a housing, first means disposed in said housing for coupling the set of rear wheels to the source of power, said first means including a first sprocket member, a continuous chain member disposed in said housing and engageable with said first sprocket member, second means disposed on said housing and operatively associated with said first means for coupling the set of front wheels to the source of power through said first means, said second means including a second sprocket member engageable with said chain member whereby said second means is coupled to said first means, a sleeve member rotatably disposed in a bore in said housing for rotation about a first axis, said sleeve member having a second axis eccentric to said first axis, means rotatably securing said second sprocket member within said bore in said sleeve member for rotation about said second axis whereby said sleeve member can be selectively rotated about said first axis for varying the distance between said first sprocket member and said second sprocket member for adjusting the tension of said chain member, and clutch means selectively operable for selectively transmitting power to the set of front wheels from said first means.

6. In an automotive vehicle having a set of front and a set of rear wheels driveable from a source of power, the combination comprising: a transfer case for coupling the set of front and the set of rear wheels to the source of power, said transfer case including first means coupling one set of the set of front and set of rear wheels to the source of power, intermediate connecting means for transferring power from said first means, second means coupling the other set of the set of front and set of rear wheels to said intermediate connecting means, one of said first and said second means including electrically actuable clutch means selectively operable for connecting said one of said first and said second means to that one of the sets of the set of front and set of rear wheels with which it is individual, said one of said means including a spindle and a drive shaft disposed coaxially relative to said spindle, said clutch means including a drive clutch member secured to one of a pair composed of said spindle and said drive shaft and a driven clutch member axially, slidably secured to the other of said pair, a resilient member engageable with said driven clutch member for normally maintaining said driven clutch member out of engagement with said drive clutch member, and an electromagnet assembly selectively energizable for moving said driven clutch member into engagement with said drive clutch member.

7. In an automotive vehicle having a set of front and a set of rear wheels driveable from a source of power, the combination comprising: a transfer case for coupling the set of front and the set of rear wheels to the source of power, said transfer case including first means coupling the set of rear wheels to the source of power, said first means including a first sprocket member, a continuous chain member engageable with said first sprocket member, second means operatively associated with said first means for coupling the set of front wheels to the source of power through said first means, said second means including a second sprocket member engageable with said chain member whereby said second means is coupled to said first means, a spindle secured to said second sprocket member and a drive shaft disposed coaxially relative to said spindle, electrically actuable clutch means selectively operable for selectively transmitting power to the set of front wheels from said second means, said clutch means including a drive clutch member secured to said spindle, a driven clutch member axially slidably secured to said drive shaft, a resilient member engageable with said driven clutch member for normally maintaining said driven clutch member out of engagement with said drive clutch member, and an electromagnet assembly selectively energizable for moving said driven clutch member into engagement with said drive clutch member.

8. In an automotive vehicle having a set of front and a set of rear wheels driveable from a source of power, the combination comprising: a transfer case for coupling the set of front and the set of rear wheels to the source of power, said transfer case including a housing, first means disposed in said housing for coupling the set of rear wheels to the source of power, said first means including a first sprocket member, a continuous chain member disposed in said housing and engageable with said first sprocket member, second means disposed in said housing and operatively connected with said first means for coupling the set of front wheels to the source of power through said first means, said second means including a second sprocket member engageable with said chain member whereby said second means is coupled to said first means, a spindle secured to said second sprocket member, and a drive shaft disposed coaxially relative to said spindle, clutch means selectively operable for selectively transmitting power to the set of front wheels from said first means, said clutch means including a drive clutch member secured to said spindle, a driven clutch member axially slidably secured to said drive shaft, a resilient member engageable with said driven clutch member for normally maintaining said driven clutch member out of engagement with said drive clutch member, and an electromagnet assembly selectively energizable for moving said driven clutch member into engagement with said drive clutch member, a sleeve member rotatably disposed in a bore in said housing for rotation about a first axis, said sleeve member having a bore having a second axis eccentric to said first axis, means rotatably securing said spindle within said bore in said sleeve member for rotation about said second axis whereby said sleeve member can be selectively rotated about said first axis for varying the distance between said first sprocket member and said second sprocket member for adjusting the tension of said chain member.

9. In an automotive vehicle having a set of front and a set of rear wheels driveable from a source of power, the combination comprising a transfer case for coupling the set of front and the set of rear wheels to the source of power, said transfer case including first gear means for coupling one set of the set of front and set of rear wheels to the source of power, intermediate gear means engageable with said first gear means for transferring power therefrom, second gear means selectively engageable with said intermediate gear means for selectively transmitting power to the other set of the set of front and set of rear wheels, one of said first and said second gear means including electrically actuable clutch means selectively operable for connecting said one of said first and said second gear means to that one of the sets of the set of front and set of rear wheels with which it is individual.

10. In an automotive vehicle having a set of front and a set of rear wheels driveable from a source of power, the combination comprising: a transfer case for coupling the front and rear wheels to the source of power, said transfer case including first gear means for coupling the set of rear wheels to the source of power, intermediate gear means engageable with said first gear means for transmitting power therefrom, second gear means selectively engageable with said intermediate gear means for selectively transmitting power to the set of front wheels from said first gear means, said second gear means including a spindle and a drive shaft disposed coaxially relative to said spindle, electrically actuable clutch means operatively associated with said second gear means for selectively connecting the set of front wheels to said second gear means, said clutch means including a drive clutch member secured to said spindle, a driven clutch member axially slidably secured to said drive shaft, a resilient member engageable with said driven clutch member for normally maintaining said driven clutch member out of engagement with said drive clutch member, and an electromagnet assembly selectively energizable for moving said driven clutch member into engagement with said drive clutch member.

11. The transfer case of claim 10 in which said first gear means and said intermediate gear means include first interconnecting gear means selectively operable for transmitting power to the set of rear wheels at a changed, preselected gear ratio and in which said second gear means and said intermediate gear means include second interconnecting gear means selectively operable for transmitting power to the set of front wheels at a changed preselected gear ratio.

References Cited by the Examiner
UNITED STATES PATENTS

| | | | |
|---|---|---|---|
| 1,348,183 | 8/1920 | Rayfield | 74—242.16 |
| 1,858,700 | 5/1932 | Besonson | 74—15.88 |
| 2,537,400 | 1/1951 | Drong. | |
| 2,630,719 | 3/1953 | Humbert et al. | 74—665 X |
| 3,046,813 | 7/1962 | Bixby. | |

DON A. WAITE, *Primary Examiner.*